United States Patent
Hara et al.

(10) Patent No.: US 7,616,104 B2
(45) Date of Patent: Nov. 10, 2009

(54) NOTIFICATION CONTROLLER, NOTIFICATION CONTROL METHOD AND NOTIFICATION INFORMATION TRANSMITTER

(75) Inventors: Tetsuya Hara, Okazaki (JP); Hirotane Ikeda, Nagoya (JP); Toshiyuki Ito, Carlsbad, CA (US); Kousuke Hara, Tokyo (JP); Hirotoshi Iwasaki, Tokyo (JP)

(73) Assignee: DENSO CORPORATION, Kariya (JP)

( * ) Notice: Subject to any disclaimer, the term of this patent is extended or adjusted under 35 U.S.C. 154(b) by 342 days.

(21) Appl. No.: 11/806,466

(22) Filed: May 31, 2007

(65) Prior Publication Data
US 2008/0088425 A1    Apr. 17, 2008

(30) Foreign Application Priority Data
Jun. 1, 2006    (JP) .............................. 2006-153435

(51) Int. Cl.
*B60Q 1/00*    (2006.01)
(52) U.S. Cl. ................... 340/438; 340/994; 340/995.14
(58) Field of Classification Search ................ 340/438, 340/989, 993, 994, 995.14, 995.18, 500, 340/506; 701/36, 204, 211; 714/734, 744
See application file for complete search history.

(56) References Cited

U.S. PATENT DOCUMENTS

| | | | | |
|---|---|---|---|---|
| 5,400,020 A | * | 3/1995 | Jones et al. | 340/994 |
| 6,314,352 B1 | | 11/2001 | Kunimatsu et al. | |
| 6,317,060 B1 | * | 11/2001 | Jones | 340/994 |
| 6,351,213 B1 | * | 2/2002 | Hirsch | 340/506 |
| 6,529,825 B2 | | 3/2003 | Nagasaka et al. | |
| 6,853,896 B2 | | 2/2005 | Akiyama | |
| 7,103,845 B2 | * | 9/2006 | Ueno et al. | 715/744 |

FOREIGN PATENT DOCUMENTS

JP    A-2003-051100    2/2003

* cited by examiner

*Primary Examiner*—Van T. Trieu
(74) *Attorney, Agent, or Firm*—Posz Law Group, PLC

(57) ABSTRACT

A notification controller allows a notification apparatus to perform notification in accordance with input of notification request information from a notification information transmitter. The notification controller determines whether or not the notification request information supplied from the notification information transmitter can be disabled from provision in accordance with a user operation. When the information supplied is determined to be disabled from provision in accordance with a user operation, the notification controller prompts a user to determine whether or not to stop the notification. The notification controller disables the notification when confirming that the user issues an instruction to stop the notification.

16 Claims, 9 Drawing Sheets

| SAFETY | CONVENIENCE | METHOD | | |
|---|---|---|---|---|
| | | DISPLAY | AUDIO | VIBRATION |
| DROWSE | | O | O | O |
| PEDESTRIAN DETECT. | | O | O | |
| VSC | | O | O | |
| SEAT BELT | | O | | |
| CLEARANCE SONAR | FUEL RECOMMEND. | O | | |
| ETC GATE | WINDOW OPEN | O | | |
| | | | | |

| LEVEL | SAFETY |
|---|---|
| 1 | DISPLAY |
| 2 | DISPLAY + SOUND |
| 3 | DISPLAY + SOUND + VIBRATION |

FIG. 6
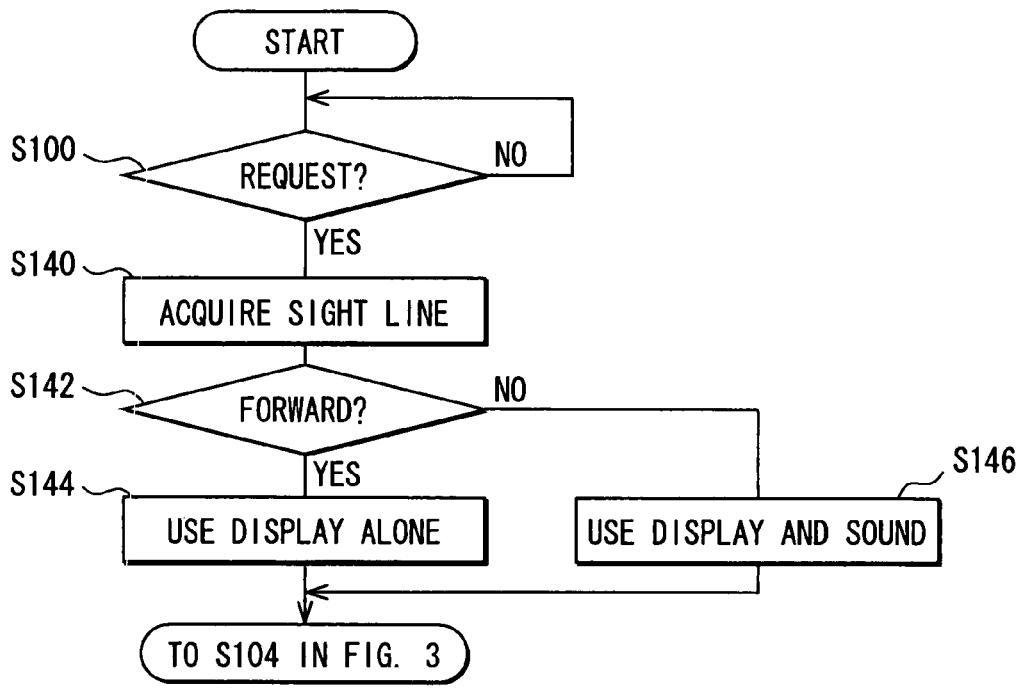
FIG. 7
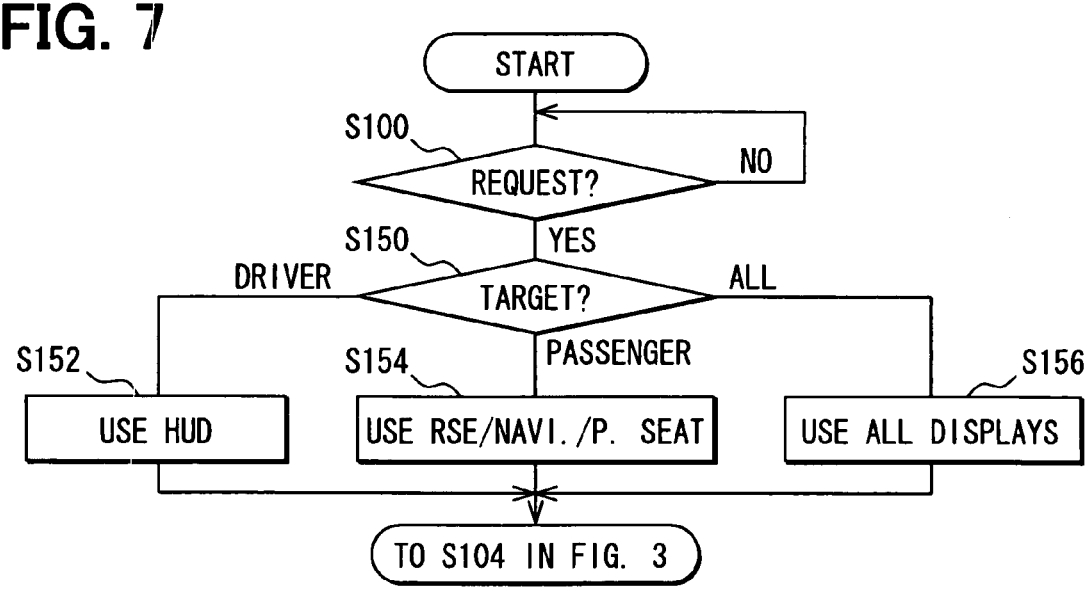
FIG. 8
|  | APPLICATIONS |
|---|---|
| DRIVER ONLY | FUEL RECOMMENDATION, DRIVER'S PRIVACY |
| PASSENGER ONLY | MULTIMEDIA MOTION PICTURE DELIVER INFO. |
| ALL | SAFETY INFO. |

FIG. 9
| PRIORITIES | CONTENTS | NOTIFICATIONS | SELECTION | RATE |
|---|---|---|---|---|
| 1 | OPEN WINDOW ALARM | 10 | 8 | 0.8 |
| 2 | FUEL RECOMMEND. | 10 | 7 | 0.7 |
| 3 | ECT SNOW | 10 | 6 | 0.6 |
| 4 | TRIP RESET | | | |
| | | | | |
| | | | | |
FIG. 10
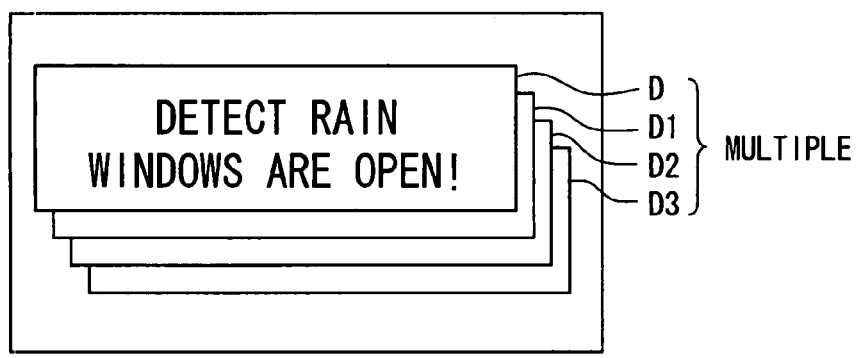
FIG. 11
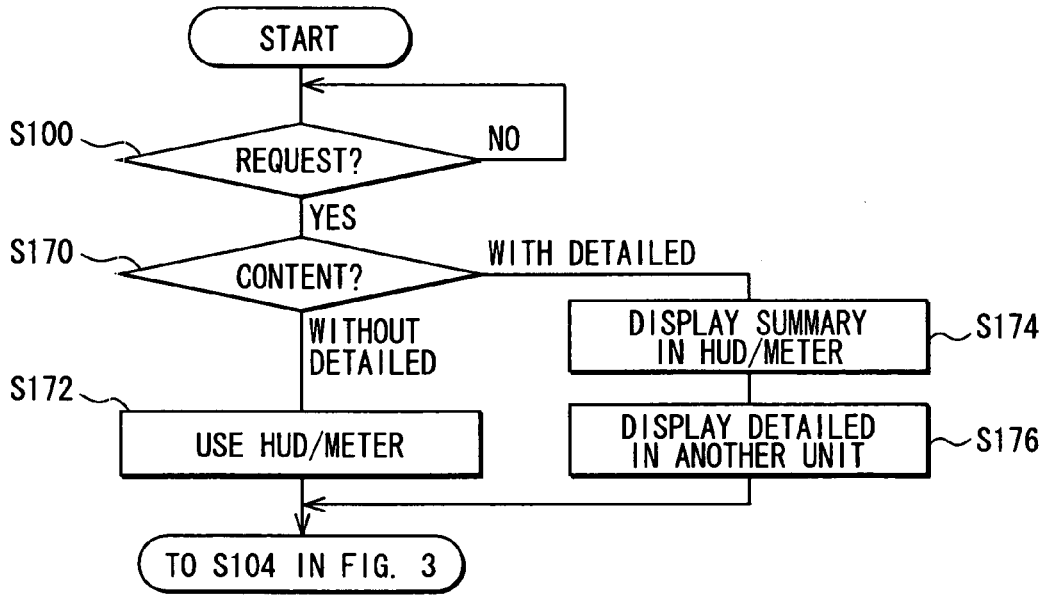

| SAFETY | PRIORITIES | CONVENIENCE | PRIORITIES |
|---|---|---|---|
| DROWSE | 1 | | |
| PEDESTRIAN DETECT. | 2 | | |
| VSC | 3 | | |
| SEAT BELT | 4 | FUEL SHORT | 4 |
| CLEARANCE SONAR | 5 | WINDOW OPEN | 5 |
| ETC GATE | 6 | KEY REMINDER | 6 |
| | | FAIL TO TURN OFF LIGHT | 7 |

NOTIFICATION CONTROLLER, NOTIFICATION CONTROL METHOD AND NOTIFICATION INFORMATION TRANSMITTER

CROSS REFERENCE TO RELATED APPLICATION

This application is based on and incorporates herein by reference Japanese Patent Application No. 2006-153435 filed on Jun. 1, 2006.

FIELD OF THE INVENTION

The present invention relates to a notification information transmitter for transmitting notification request information corresponding to situations about parts of and around a vehicle and a notification controller and notification control method for allowing a notification apparatus to generate a notification in accordance with notification request information supplied from the notification information transmitter.

BACKGROUND OF THE INVENTION

Recently, the automobile technology is researching and developing various driving support apparatuses for the purpose of decreasing loads on a driver, preventing an accident, and ensuring preventive measures for safety. The driving support apparatuses include an adaptive cruise control system, a lane keeping system, a night vision, and a perimeter monitoring apparatus, for example. These driving support apparatuses can be used with various settings and acquire necessary information under an intended condition or automatically control a vehicle within a range applicable to an intended situation.

However, a driver needs to stop the functions or configure operation conditions of the driving support apparatuses according to surrounding situations. The driver may feel such operations troublesome but also forget a function in a situation appropriate for the apparatus to function. The driver may not be able to make the most of the available apparatus.

According to the prior art (e.g., see Patent Document 1), the apparatus is provided with an instruction from a driver or a notification from a network portion. In this case, the apparatus performs an action selection process of selecting an action to be taken by the driver based on the content of the instruction or the notification and driver information stored in RAM. The apparatus presents the driver with an action and a parameter selected by this process. When accepting an instruction for enabling the action, the apparatus determines the presented action to take. When an action or a parameter is input, the apparatus determines the changed action to take. The apparatus allows associated devices to perform a control operation based on the determined action.

Patent Document 1: JP-2003-252130 A (USP-6853896)

The apparatus described in Patent Document 1 generates a notification in accordance with a user operation. A user cannot easily stop the notification. For example, the user needs to turn off a power supply provided for the driving support apparatus such as the adaptive cruise control system or the perimeter monitoring apparatus to disable a notification in response to a notification request supplied from the apparatus. The user may feel it troublesome to manipulate an operation unit specifically provided for the apparatus for disabling the notification.

There may be provided notification request information such as an important notification request concerning safety. In such case, it is effective to notify the information using display, sound, and vibration methods so that the user can recognize the information without fail. When the provided notification request is simply an announcement, however, the user may feel the notification using the same methods annoying.

SUMMARY OF THE INVENTION

The present invention has been made in consideration of the foregoing. It is therefore an object of the present invention to reduce a nuisance to users.

It is preferable to notify an important notification request concerning safety in preference to a less important notification request such as an announcement when both requests are supplied. The invention disclosed in Patent Document 1 contains no description about how to issue multiple notification requests when supplied. The important notification concerning safety is not necessarily issued in preference to the other notifications.

The present invention has been made in consideration of the foregoing. It is therefore another object of the present invention to provide a user with an appropriate notification when multiple notification requests are supplied.

According to a first aspect of the invention, a notification controller is provided as follows. A storage unit is included for storing a table indicating information as to whether or not notification of notification request information is allowed to be disabled based on a user operation, the notification request information being supplied from a notification information transmitter and corresponding to a situation about parts of and around a vehicle. A first notification control unit is included for allowing a notification apparatus to perform a notification in accordance with input of the notification request information. A notification stop determination unit is included for determining, based on the information indicated in the stored table, whether or not notification of the notification request information is allowed to be disabled based on a user operation. A notification stop confirmation unit is included for prompting a user to enable or disable notification when the notification stop determination unit determines that notification of the notification request information is allowed to be disabled based on a user operation. A notification stop unit is included for stopping notification performed by the first notification control unit when the notification stop confirmation unit confirms a user instruction to stop the notification.

According to the above-mentioned construction, it may be determined that the notification request information supplied from the notification information transmitter can be disabled from provision in accordance with a user operation. In this case, the user is inquired whether or not to stop the notification. The notification stops upon confirmation that the user issues an instruction to stop the notification. The user can easily instruct the notification stop to disable the notification and can reduce nuisances.

According to a second aspect of the invention, a notification controller is provided as follows. The notification controller allows a notification apparatus to perform a notification in accordance with notification request information supplied from a notification information transmitter that detects a situation about parts of and around a vehicle. The notification controller includes: a storage unit for storing a priority table providing notification request information supplied from the notification information transmitter with priorities for identifying a prioritized order of notifications; a notification request information input determination unit for determining whether or not the notification information transmitter supplies multiple pieces of notification request information; and a second notification control unit for, when the notification request information input determination unit determines input of multiple pieces of notification request information from the notification information transmitter, allowing the notification apparatus to preferentially notify a most highly prioritized notification request information in accordance with priorities indicated in the priority table.

The construction can determine that the notification information transmitter supplies multiple pieces of notification request information. In such case, the notification is provided by giving preference to the most highly prioritized notification request information in accordance with the priorities indicated in the priority table. The user can be appropriately provided with the notification when multiple notification requests are supplied.

According to a third aspect of the invention, a notification information transmitter is provided as follows. A transmission unit is included for detecting a situation about parts of and around a vehicle and transmitting notification request information corresponding to the detected situation to a notification controller that allows a notification apparatus to perform a notification. A notification request information stop unit is included for allowing the transmission unit to stop transmitting notification request information when receiving, from the notification controllers, information indicating a stop of a notification corresponding to notification request information in accordance with a user instruction for allowing the notification controller to stop the notification.

BRIEF DESCRIPTION OF THE DRAWINGS

The above and other objects, features, and advantages of the present invention will become more apparent from the following detailed description made with reference to the accompanying drawings. In the drawings:

FIG. 6 is a flowchart showing a process of a notification controller according to a third embodiment;

FIG. 7 is a flowchart showing a process of a notification controller according to a fourth embodiment;

FIG. 8 is a diagram illustrating notification request information and an occupant for whom such information is intended;

FIG. 9 is a diagram illustrating in detail a table assigned with priorities according to a fifth embodiment;

FIG. 10 shows a display example on a display unit under control of a notification controller;

FIG. 11 is a flowchart showing a process of a notification controller according to a sixth embodiment;

DETAILED DESCRIPTION OF THE PREFERRED EMBODIMENTS

First Embodiment

Figures 1, 2:
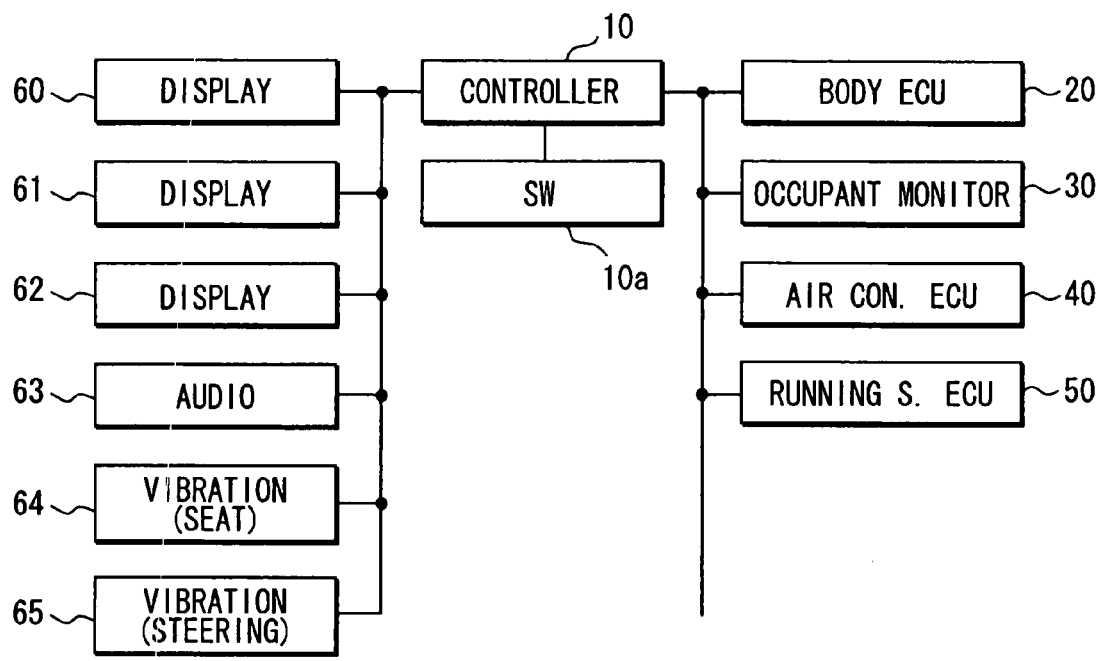
FIG. 1 shows an overall construction of a notification information transmitter and a notification controller according to a first embodiment.
FIG. 2 is a diagram illustrating in detail a table stored in memory of the notification controller.

FIG. 1 shows an overall construction of a notification information transmitter and a notification controller, both of which are mounted in a subject vehicle, according to a first embodiment. A notification controller 10 connects with a notification information transmitter including a body ECU (Electronic Control Unit) 20, an occupant monitor 30, an air conditioning ECU 40, and a running system ECU 50. The notification controller 10 also connects with a notification apparatus including display devices 60 through 62, an audio apparatus 63, a vibration apparatus (seat) 64, and a vibration apparatus (steering) 65.

The notification information transmitters 20 through 50 detect situations about parts of and around or surrounding the vehicle and transmit notification request information, which is associated with the detected situation, to the notification controller 10.

The notification controller 10 is constructed as a computer including a CPU, memory, and I/O (Input/Output) devices. The CPU of the notification controller 10 performs various processes according to a program stored in the memory.

The notification controller 10 is supplied with a signal corresponding to a user operation from an operation switch (SW) 10a. The operation switch 10a includes a touch-sensitive switch overlaid over display units of the display devices 60 through 62 to be described later and a steering switch provided for a steering system although these switches are not shown in the drawing.

The display device 60 is constructed as a display unit provided for a meter and as a display unit provided for a head-up display (HUD). The display device 61 is constructed as a display unit for a navigation apparatus. The display device 62 is constructed as a display unit for rear seat entertainment (RSE). These display devices 60 through 62 use the display units to display an image corresponding to a signal supplied from the notification controller 10.

The audio apparatus 63 has a speaker (not shown) and allows the speaker to generate sound or speech corresponding to an audio signal supplied from the notification controller 10.

The vibration apparatus (seat) 64 includes a vibration unit that is provided for each seat and vibrates in response to a signal supplied from the notification controller 10. The vibration unit vibrates to provide notification for an occupant on the seat.

The vibration apparatus (steering) 65 includes a vibration unit that is provided for the steering system and vibrates in response to a signal supplied from the notification controller 10. The vibration unit vibrates to provide notification for an occupant on the seat.

The above-mentioned memory of the notification controller 10 stores a table. The table indicates whether or not the notification request information supplied from the notification information transmitters 20 through 50 can be disabled from being provided in accordance with a user operation. Based on the information stored in this table, the notification controller 10 determines whether or not the notification request information supplied from the notification information transmitters 20 through 50 can be disabled from provision in accordance with a user operation.

FIG. 2 shows the table in detail. The notification request information supplied from the notification information transmitters 20 through 50 includes (i) safety notification request information concerning safety and (ii) convenience notification request information concerning convenience. The table contains notification request information supplied from the notification information transmitters 20 through 50. The information is categorized into the safety notification request information and the convenience notification request information. The table also shows a notification method (display, sound, or vibration) corresponding to the notification request information. Though not shown in this table, display notifications are colored corresponding to the notification request information. For example, a red color is used for a display of the safety notification request information. A green color is used for a display of the convenience notification request information.

Examples of the safety notification request information include a drowse alarm, pedestrian detection, Vehicle Stability Control (VSC) sensing, seat belt buckle release, perimeter monitoring alarm (clearance sonar), and ETC (Electronic Toll Collection) gate approach. Examples of the convenience notification request information include fuel supply recommendation and open window alarm in rainy weather.

According to the embodiment, the safety notification request information must not be disabled from being provided in accordance with a user operation. The convenience notification request information may be disabled from being provided in accordance with a user operation.

For example, the drowse alarm belongs to the safety notification request information that must not be disabled from being provided in accordance with a user operation. The drowse alarm is settled to be notified by means of a display, sound, and vibration. The open window alarm in rainy weather belongs to the convenience notification request information that may be disabled from being provided in accordance with a user operation. This alarm is settled to be notified only by means of a display. The safety notification request information needs to be surely recognized by a user. This information is settled to be notified in a manner more recognizable to the user than the convenience notification request information.

Figure 3:
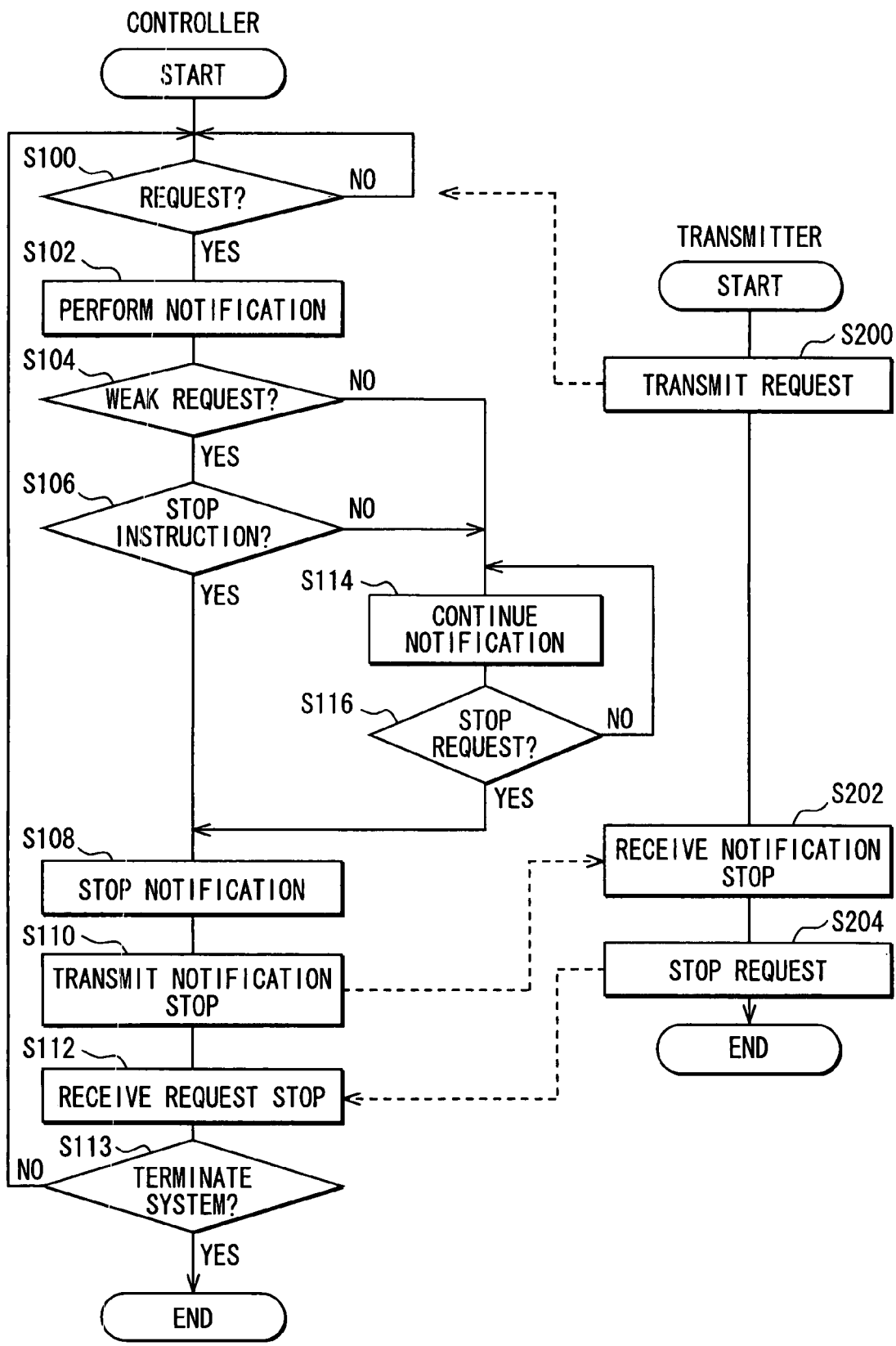
FIG. 3 is a flowchart showing processes of the notification information transmitter and the notification controller according to the first embodiment.

With reference to FIG. 3, the following describes processes of the notification information transmitters 20 through 50 and the notification controller 10. The right part of FIG. 3 shows the process of the notification information transmitters 20 through 50. The left part thereof shows the process of the notification controller 10. The notification information transmitters 20 through 50 transmit different contents of the notification request information but are represented as a common process at the right of FIG. 3. The example shows the process of the notification information transmitter (i.e., body ECU) 20. When an ignition switch is turned on to activate an operation state, the notification information transmitter 20 starts the process in FIG. 3. The notification controller 10 periodically performs the process in FIG. 3.

The notification controller 10 determines whether or not a notification request is issued (Step S100). Specifically, the notification controller 10 determines whether or not notification request information is supplied from the notification information transmitter 20.

When no notification request information is supplied from the notification information transmitter 20, the determination at Step S100 yields a negative result and is repeated.

When the notification information transmitter 20 transmits notification request information to the notification controller 10 (Step S200), the determination at Step S100 yields an affirmative result. The notification controller 10 performs a notification (Step S102). Specifically, the notification controller 10 specifies a notification method corresponding to the notification request information supplied from the notification information transmitter 20 in accordance with the table in FIG. 2. The notification controller 10 allows the notification apparatuses 60 through 65 to provide the information using the specified notification method.

When the notification information transmitter 20 supplies the notification request information about the drowse alarm, for example, the information is provided by means of a display, sound, and vibration. In this case, the display unit displays the information in red. When the notification information transmitter 20 supplies the notification request information about the open window alarm in rainy weather, the information is provided only by means of a display. In this case, the display unit displays the information in green.

The notification controller 10 determines whether or not the notification request is weak (Step S104). According to the embodiment, the safety notification request information belongs to a strong notification request that must not be disabled from being provided in accordance with a user operation. The convenience notification request information belongs to a weak notification request that may be disabled from being provided in accordance with a user operation. The notification controller 10 determines whether or not the notification request information supplied from the notification information transmitter 20 belongs to the weak notification request.

When the convenience notification request information is supplied from the notification information transmitter 20, the determination at Step S104 yields an affirmative result. The notification controller 10 prompts a user to determine whether or not to stop the notification (Step S106). Specifically, the notification controller 10 allows the display devices 60 through 62 to display a message such as "Stop Alarm?" on the corresponding display units and a screen prompting a choice between "YES" or "NO."

When the user selects "YES," the determination at Step S106 yields an affirmative result. The notification controller 10 stops the notification (Step S108). Specifically, the notification controller 10 stops the notification performed by the notification apparatuses 60 through 65 at Step S102.

The notification controller 10 transmits information about the notification stop to the notification information transmitter 20 (Step S110).

The notification information transmitter 20 receives the information about the notification stop (Step S202). The notification information transmitter 20 stops the transmission of the notification request information transmitted at Step S200 (Step S204). The notification information transmitter 20 transmits information indicating the notification request stop to the notification controller 10 and terminates the process.

The notification controller 10 receives the information indicating the notification request stop from the notification information transmitter 20 (Step S112). The notification controller 10 then determines whether or not to terminate the system (Step S113). Specifically, the notification controller 10 detects whether or not the ignition switch is turned off.

When the ignition switch is not turned off, the determination at Step S113 yields a negative result. The notification controller 10 returns Step S100 and repeats the above-mentioned process.

When the ignition switch is turned off, the determination at Step S113 yields an affirmative result. The process terminates.

The display units of the display devices 60 through 62 present a screen prompting the user to determine whether or not to stop the notification. When the user selects "NO," the determination at Step S106 yields a negative result. The notification controller 10 continues the notification (Step S114). Specifically, the notification controller 10 continues the notification, which was started to be performed by the notification apparatuses 60 through 65 at Step S102.

When the safety notification request information is supplied, the notification controller 10 allows the notification apparatuses 60 through 65 to continue the notification without inquiring of the user whether or not stop the notification.

The notification controller 10 determines whether or not a notification stop request is issued (Step S116). When providing the notification request information transmitted at Step S200 becomes unnecessary, the notification information transmitter 20 transmits notification stop request information to the notification controller 10. The notification stop request information instructs to stop the notification. The notification controller 10 determines whether or not the notification stop request is issued based on whether or not the notification stop request information is received.

When the notification controller 10 does not receive the notification stop request information from the notification information transmitter 20, the determination at Step S116 yields a negative result. The notification controller 10 repeats the process at Step S114.

When the notification controller 10 receives the notification stop request information, the determination at Step S116 yields an affirmative result. The notification controller 10 proceeds to Step S108.

When receiving the notification stop request information from the notification information transmitter 20, the notification controller 10 allows the notification apparatuses 60 through 65 to stop the notification performed.

When the safety notification request information is supplied from the notification information transmitter 20, the determination at Step S104 yields a negative result. The notification controller 10 proceeds to Step S114.

When the safety notification request information is supplied from the notification information transmitter 20, the notification controller 10 allows the notification apparatuses 60 through 65 to continue the notification without prompting the user to determine whether or not to stop the notification.

According to the above-mentioned construction, the notification controller may determine that the notification request information supplied from the notification information transmitter may be disabled from provision in accordance with a user operation. In this case, the notification controller inquires of the user whether or not to stop the notification. The notification controller can stop the notification when confirming that the user issues an instruction to stop the notification. The user can easily instruct the notification stop to disable the notification and can reduce nuisances.

The notification controller may determine that the notification request information supplied from the notification information transmitter must not be disabled from provision in accordance with a user operation. Alternatively, the notification controller may not confirm a user response to stop the notification. In such cases, the notification controller can continue the notification without confirming the user response to stop the notification.

When it is determined that the notification information transmitter issues a notification stop request for the notification request information, the notification controller can disable the continued notification.

The notification apparatus can perform a notification in accordance with the notification method indicated in the table.

When disabling the notification using the notification apparatus, the notification controller can transmit information about this situation to the notification information transmitter.

The above-mentioned embodiment has described that the user manually issues a notification stop instruction to the notification controller. As will be described below, however, the notification stop instruction may be automatically issued independently of a user operation.

For example, a notification stop instruction can be automatically issued to the notification controller in accordance with estimated situations about parts of and around the vehicle using a model learned from a history of user operations. Such model is exemplified by a Bayesian network or a collaborative filter.

Since a vehicle state is sensed to automatically issue the notification stop instruction, it is possible to detect a "right turning" state and automatically stop the weak notification, for example.

It may be preferable to predict situations about parts of and around the vehicle and automatically issue the notification stop instruction to the notification controller in accordance with the predicted situation. In this case, a neural network can be used for the prediction.

This construction makes it possible to determine a situation such as "turning right after ten seconds" based on a currently detected position and a traveling route acquired from a navigation apparatus and automatically stop a weak notification.

Second Embodiment

Figures 4, 5:
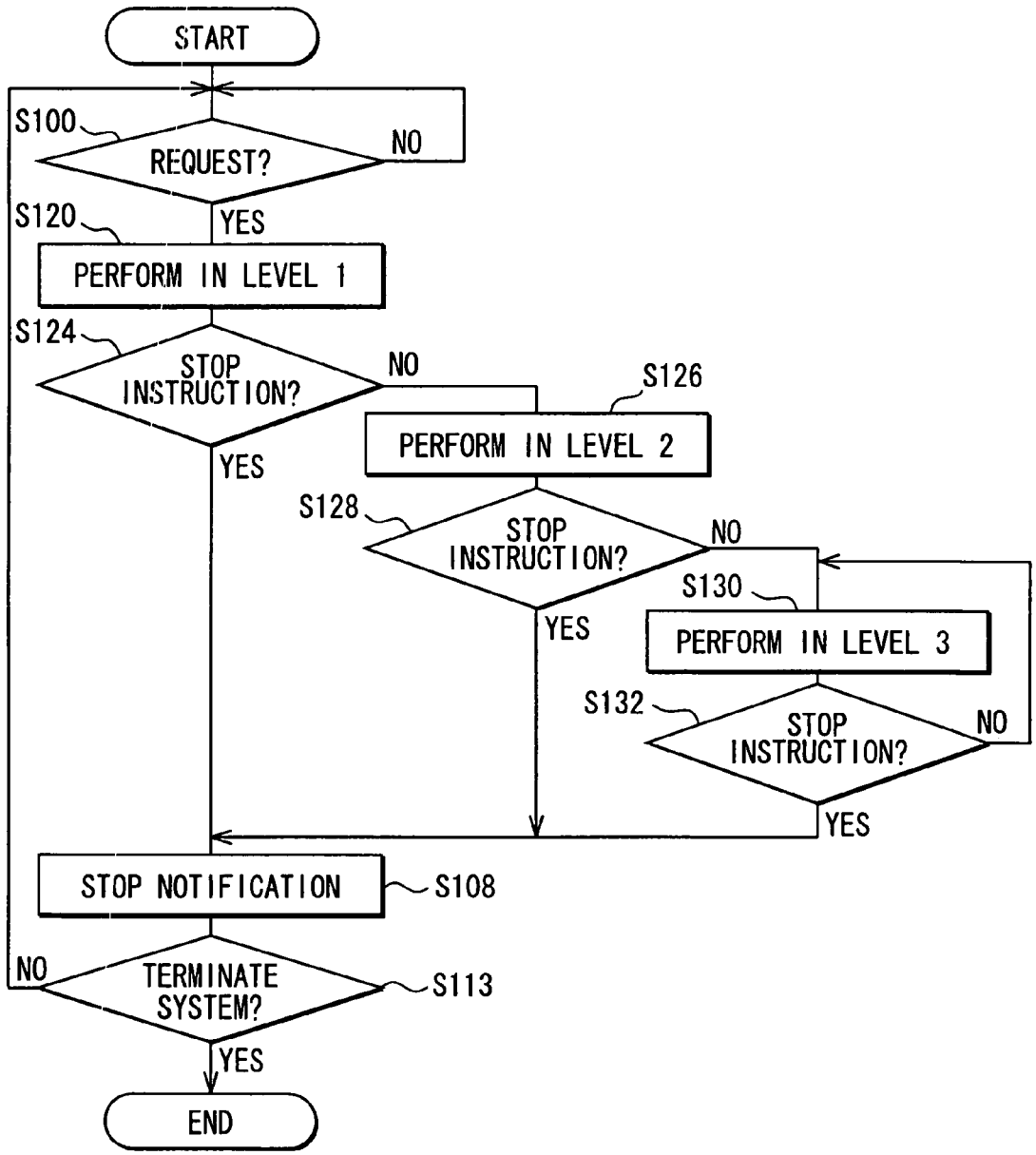
FIG. 4 is a flowchart showing a process of a notification controller according to a second embodiment.
FIG. 5 is a diagram illustrating correspondence between a notification level and a notification method.

FIG. 4 shows a process of the notification controller 10 according to a second embodiment. The constructions of the notification controller 10, the notification information transmitters 20 through 50, and the notification apparatuses 60 through 65 according to the second embodiment are equal to those according to the first embodiment as shown in FIG. 1.

According to the above-mentioned example of the first embodiment, the notification controller 10 specifies a notification method corresponding to the notification request information supplied from the notification information transmitters 20 through 50 in accordance with the information stored in the table shown in FIG. 2. The notification controller 10 allows the notification apparatuses 60 through 65 to perform the notification using the specified method. The notification controller 10 prompts the user to determine whether or not to stop the notification when the notification request information belongs to the convenience notification request information. In the second embodiment, the notification controller 10 allows the notification apparatuses 60 through 65 to perform a notification according to a notification method corresponding to a predetermined notification level. When the notification controller 10 does not confirm that the user instructs to stop the notification, the notification controller 10 allows the notification apparatuses 60 through 65 to perform the notification using a notification method more recognizable to the user and prompts the user to determine whether or not stop the notification. The mutually corresponding parts in the second and first embodiments are designated by the same reference numerals and a detailed description is omitted for simplicity. The following describes mainly differences from the first embodiment.

The notification controller 10 determines whether or not a notification request is issued (Step S100). When the notification information transmitter 20 transmits notification request information, the determination at Step S100 yields an affirmative result. The notification controller 10 allows the notification apparatuses 60 through 65 to perform a notification at notification level 1 (Step S120).

The embodiment provides notification methods corresponding to notification levels as shown in FIG. 5. Notification level 1 provides a notification using only display. Notification level 2 provides a notification using display and sound. Notification level 3 provides a notification using display, sound, and vibrations (seat and steering).

At Step S120, the notification controller 10 performs a notification using only display. The notification controller 10 prompts the user to determine whether or not to stop the notification (Step S124). Specifically, the notification controller 10 allows the display devices 60 through 62 to display a selectable message such as "Stop Alarm?" on the corresponding display units. In this manner, the notification controller 10 prompts the user to determine whether or not to stop the notification.

When the user selects the "Stop Alarm?" message, the determination at Step S124 yields an affirmative result. The notification controller 10 stops the notification performed at Step S124. The notification controller 10 determines whether or not to terminate the system (Step S113).

When the ignition switch is not turned off, the determination at Step S113 yields a negative result. The notification controller 10 returns Step S100 and repeats the above-mentioned process.

When the ignition switch is turned off, the determination at Step S113 yields an affirmative result. The process terminates.

When the user does not select the "Stop Alarm?" message in response to the notification at Step S120 after lapse of a specified time period, the determination at Step S124 yields a negative result. The notification controller 10 allows the notification apparatuses 60 through 63 to perform a notification at notification level 2 (Step S126). Specifically, the notification controller 10 allows the display devices 60 through 62 to display the selectable message such as "Stop Alarm?" on the corresponding display units. In addition, the notification controller 10 allows the audio apparatus 63 to generate an audible message such as "Do you want to stop the alarm?" In this manner, the notification controller 10 re-prompts the user to determine whether or not to stop the notification (Step S128).

When the user selects the "Stop Alarm?" message, the determination at Step S128 yields an affirmative result. The notification controller 10 proceeds to Step S108. In this manner, the notification stops when the user selects the "Stop Alarm?" message.

When the user does not select the "Stop Alarm?" message despite the notification using display and sound after lapse of a specified time period, the determination at Step S128 yields a negative result. The notification controller 10 allows the notification apparatuses 60 through 65 to perform a notification at notification level 3 (Step S130). Specifically, the notification controller 10 allows the vibration apparatus (seat) 64 and the vibration apparatus (steering) 65 to start vibrating in addition to the display on the display units of the display devices 60 through 62 and the audible output from the audio apparatus 63. In this manner, the notification controller 10 re-prompts the user to determine whether or not to stop the notification (Step S132).

When the user does not select the "Stop Alarm?" message, the determination at Step S132 yields a negative result. The notification controller 10 continues the notification performed at Step S130.

When the user selects the "Stop Alarm?" message, the determination at Step S132 yields an affirmative result. The notification controller 10 proceeds to Step S108. In this manner, the notification stops when the user selects the "Stop Alarm?" message.

When not confirming a user instruction to stop the notification, the notification controller 10 provides the notification by stepwise changing the notification method so as to be more recognizable to the user. It is possible to more reliably allow the user to become aware of the notification.

The embodiment provides the example of performing the notification at Steps S120, S126, and S130 and prompting the user to determine whether or not to stop the notification at Steps S124, S128, and S132. Another example may be available. After performing the notification at Steps S120, S126, and S130, the notification controller 10 may determine at Step S104 in FIG. 3 whether or not the notification request information can be disabled from provision in accordance with a user operation. When the determination yields an affirmative result, the notification controller 10 may prompt the user to determine whether or not to stop the notification.

As still another example, the notification controller 10 may perform the process at Steps S110 and S112 in FIG. 3 after Step S108 in FIG. 4.

Third Embodiment

FIG. 6 shows a process of the notification controller 10 according to a third embodiment. The embodiment determines whether or not a driver's sight line is directed forward. When the driver's sight line is not determined to be directed forward, the notification apparatuses 60 through 65 are allowed to perform a notification using a notification method. This method is more recognizable to the driver than that applicable when the driver's sight line is determined to be directed forward.

The notification controller 10 determines whether or not a notification request is issued (Step S100). When the notification information transmitter 20 transmits notification request information, the determination at Step S100 yields an affirmative result. The notification controller 10 uses the notification information transmitter (occupant monitor) 30 to acquire information indicating whether or not the driver's sight line is directed forward (Step S140).

The notification controller 10 determines whether or not the driver's sight line is directed forward based on the information indicating whether or not the driver's sight line is directed forward (Step S142).

When the driver's sight line is directed forward, the determination at Step S142 yields an affirmative result. The notification controller 10 performs a notification using only display (Step S144) and proceeds to Step S104 in FIG. 3.

When the driver's sight line is not directed forward, the determination at Step S142 yields a negative result. The notification controller 10 performs a notification using display and sound (Step S146) and proceeds to Step S104 in FIG. 3.

When the driver's sight line is not determined to be directed forward, the notification apparatuses 60 through 63 are allowed to perform a notification using the notification method more recognizable to the driver than that applicable to the driver's sight line determined to be directed forward.

When the driver's sight line is not determined to be directed forward as mentioned above, a notification is provided in a notification method more recognizable to the driver than that applicable to the driver's sight line directed forward determined by sight line determination means. When the driver drives inattentively, for example, a notification is provided in the notification method more recognizable than that used when the driver drives looking ahead. It is possible to more reliably allow the user to become aware of the notification.

Fourth Embodiment

The above-mentioned embodiments have shown the example of providing the notification apparatus with the display devices 60 through 62. The notification apparatus according to a fourth embodiment further includes a display device (not shown) provided for a passenger seat (P seat). The above-mentioned embodiments have shown the example of allowing the notification apparatuses 60 through 65 to perform a notification with no consideration for a target to be notified. The fourth embodiment determines for which occupant the notification request information supplied from the notification information transmitters 20 through 50 is targeted. The notification apparatuses 60 through 65 are used to provide a notification to the occupant selected by the determination.

FIG. 7 shows a process of the notification controller 10 according to the embodiment. The notification controller 10 determines whether or not a notification request is issued (Step S100). When the notification information transmitters 20 through 50 transmit notification request information, the determination at Step S100 yields an affirmative result. The notification controller 10 determines which occupant the notification request information supplied from the notification information transmitters 20 through 50 is targeted for (Step S150).

As shown in FIG. 8, the memory of the notification controller 10 according to the embodiment stores information indicating which occupant should be notified of the notification request information supplied from the notification information transmitters 20 through 50. Based on this information, the notification controller 10 determines which occupant the notification request information is targeted for. The notification request information targeted for a driver includes fuel supply recommendation and a notification concerning the driver's privacy such as a notification of incoming call on the driver's mobile phone. This notification is available when the connected notification information transmitter has a function of notifying incoming call on a mobile phone owned by the driver. The notification request information targeted for only a passenger includes delivery information about multimedia motion pictures. The notification request information targeted for all occupants includes safety notification request information such as a drowse alarm.

When the notification information transmitters 20 through 50 supply the notification request information targeted for only the driver, the determination at Step S15 results in "driveronly." The notification controller 10 displays a notification on the display unit (HUD in this example) of the display device 60 (Step S152). The notification controller 10 then proceeds to Step S104 in FIG. 3. The display unit (HUD) of the display device 60 can be easily viewed by the driver and less easily viewed by an occupant on the passenger seat or the rear seat.

When the notification information transmitters 20 through 50 supply the notification request information targeted for only the driver, the notification is displayed on the display device provided for the driver as a notification target.

When the notification information transmitters 20 through 50 supply the notification request information targeted for only a passenger, the determination at Step S15 results in "passenger only." The notification controller 10 displays a notification on the display unit (for a navigation system) of the display device 61, the display unit (RSE) of the display device 62, and a display unit of a display device (not shown) provided for the passenger seat (P seat) (Step S154). The notification controller 10 then proceeds to Step S104 in FIG. 3.

When the notification information transmitters 20 through 50 supply the notification request information targeted for only the passenger, the notification is displayed on the display device provided for only the passenger as a notification target.

When the notification information transmitters 20 through 50 supply the notification request information targeted for all occupants, the determination at Step S150 results in "all occupants." The notification controller 10 displays the notification on the display unit (HUD) of the display device 60, the display unit (for a navigation system) of the display device 61, the display unit (RSE) of the display device 62, and the display unit of the display device (not shown) provided for the passenger seat (P seat) (Step S156). The notification controller 10 then proceeds to Step S104 in FIG. 3.

When the notification information transmitters 20 through 50 supply the notification request information targeted for all the occupants, the notification is displayed on the display devices provided for all the occupants as notification targets.

As mentioned above, the notification controller 10 determines which occupant the notification request information supplied from the notification information transmitters is targeted for. The notification controller 10 provides the notification to the occupant specified as a notification target by this determination. The occupant need not be aware of a notification targeted for the other occupants. This makes it possible to reduce nuisances to the occupant.

Fifth Embodiment

The above-mentioned embodiments have shown the example of allowing the notification apparatuses 60 through 65 to provide the notification request information in accordance with the notification method as shown in FIG. 2 or FIG. 5. A fifth embodiment uses a table that indicates priorities for identifying a prioritized order of notifications assigned to the notification request information supplied from the notification information transmitter. When the notification information transmitters 20 through 50 supply multiple pieces of notification request information, the table is used to allow the notification apparatuses 60 through 65 to preferentially notify the most highly prioritized notification request information out of the others.

The embodiment provides the notification request information supplied from the notification information transmitters 20 through 50 with priorities for identifying a prioritized order of notifications as well as the notification methods (display, sound, and vibration). A constant priority is assigned to the safety notification request information because changing the priority is inappropriate for this information. Some convenience notification request information is capable of a response as a user's selection operation. A priority of such convenience notification request information can be changed according to the number of selection operations by the user.

FIG. 9 shows in detail a table used for the convenience notification request information capable of a response as a user's selection operation. The table shows priorities for identifying a prioritized order of notifications as well as the notification methods (display, sound, and vibration) corresponding to the convenience notification request information capable of a response as a user's selection operation. The priorities in the table are determined by the order of selection rates. A selection rate is found by dividing the number of user's selection operations by the number of notifications performed in a specified time period.

The notification information transmitters 20 through 50 may supply multiple pieces of notification request information. In such case, the notification controller 10 according to the embodiment uses the display units of the display devices 60 through 62 to display the most highly prioritized notification request information out of the others supplied from those transmitters in accordance with the priorities shown in the table of FIG. 9.

As shown in FIG. 10, the notification controller 10 allows the display units of the display device 60 through 62 to display the information so that the user can recognize input of the notification request information other than the most highly prioritized notification request information. According to the example in FIG. 10, display panes D1 through D3 are overlaid behind display pane D as the most highly prioritized notification request information. This indicates that there is supplied notification request information other than the most highly prioritized one.

When the notification information transmitters supply multiple pieces of notification request information as mentioned above, the most highly prioritized notification request information is notified in preference to the others in accordance with the priorities stored in the table. For example, let us consider a case of equally providing an important notification concerning safety and a less important notification such as announcement. The user may not notice the important notification at all or may notice it too late. The embodiment can solve such situation.

The notification is provided so that the user can recognize input of the notification request information other than the most highly prioritized notification request information. The user can recognize input of the notification request information other than the most highly prioritized one.

Sixth Embodiment

FIG. 11 shows a process of the notification controller 10 according to a sixth embodiment. The notification request information supplied from the notification information transmitters 20 through 50 may contain detailed information related to the notification request information. The embodiment determines whether or not the notification request information supplied from the notification information transmitters 20 through 50 contains detailed information related to the notification request information. When the notification request information is determined to contain the detailed information related to it, multiple display units are used to independently display the notification request information and the detailed information related to it.

The notification controller 10 determines whether or not a notification request is issued (Step S100). When the notification information transmitters 20 through 50 transmit notification request information, the determination at Step S100 yields an affirmative result. The notification controller 10 determines whether or not the notification request information contains detailed information related to it (Step S170).

When the notification request information does not contain detailed information related to it, the determination at Step S170 results in "no detailed information." The notification controller 10 displays the notification on the display unit (meter or HUD) of the display device 60. The notification controller 10 proceeds to Step S104 in FIG. 3.

The display unit (meter or HUD) of the display device 60 displays the notification corresponding to the notification request information.

When the notification request information contains detailed information related to it, the determination at Step S170 results in "detailed information provided." The notification controller 10 displays a summary of the notification request information on the display unit (meter and HUD) of the display device 60 (Step S174).

The notification controller 10 displays the notification request information and the related detailed information on a large display. Specifically, the notification controller 10 displays the notification request information and the related detailed information on the display unit (for the navigation system) of the display device 61. The notification controller 10 then proceeds to Step S104 in FIG. 3.

Figure 12:
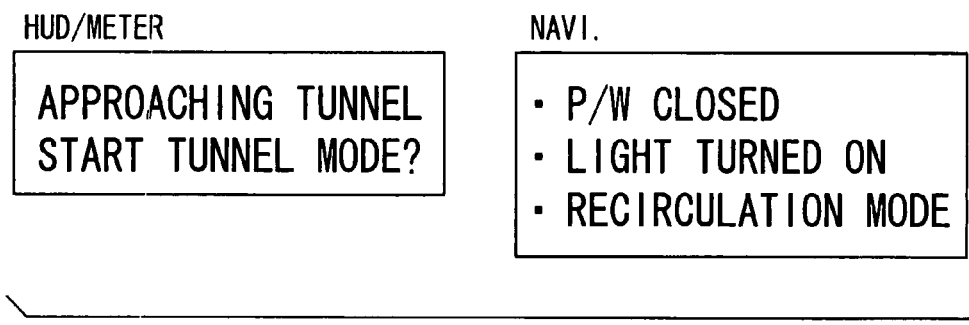
FIG. 12 shows a display example on a display unit under control of a notification controller.

FIG. 12 shows a display example on the display unit (meter or HUD) of the display device 60 and the display unit (for the navigation system) of the display device 61. As shown in FIG. 12, the display unit of the display device 60 displays a summary such as "Approaching a tunnel. Do you start tunnel mode?" The display unit of the display device 61 displays detailed information related to the notification request information displayed on the display unit of the display device 60. The detailed information includes "PAN closed, light turned on, and recirculation mode," for example.

When the notification request information is determined to contain detailed information related to it, these pieces of information may be independently displayed on multiple display units.

As mentioned above, when the notification request information is determined to contain detailed information related to it, these pieces of information may be independently displayed on multiple display units. The user can use multiple display units to simultaneously recognize the notification request information and the detailed information related to it.

The display device provided for the vehicle uses the display unit having a relatively small area. The notification can be effectively provided by independently displaying information on multiple display units.

Seventh Embodiment

The example of the sixth embodiment determines whether or not the notification request information supplied from the notification information transmitters 20 through 50 contains detailed information related to the notification request information. When the notification request information is determined to contain the detailed information related to it, multiple display units are used to independently display the notification request information and the detailed information related to it. On the other hand, a seventh embodiment performs the following when the notification request information is determined to contain the detailed information related to it. The display unit displays the notification request information and a selection unit for switching to detailed information related to the notification request information. When the user selects the selection unit displayed on the display unit, the display unit changes the current view to the detailed information related to the notification request information.

Figure 13:
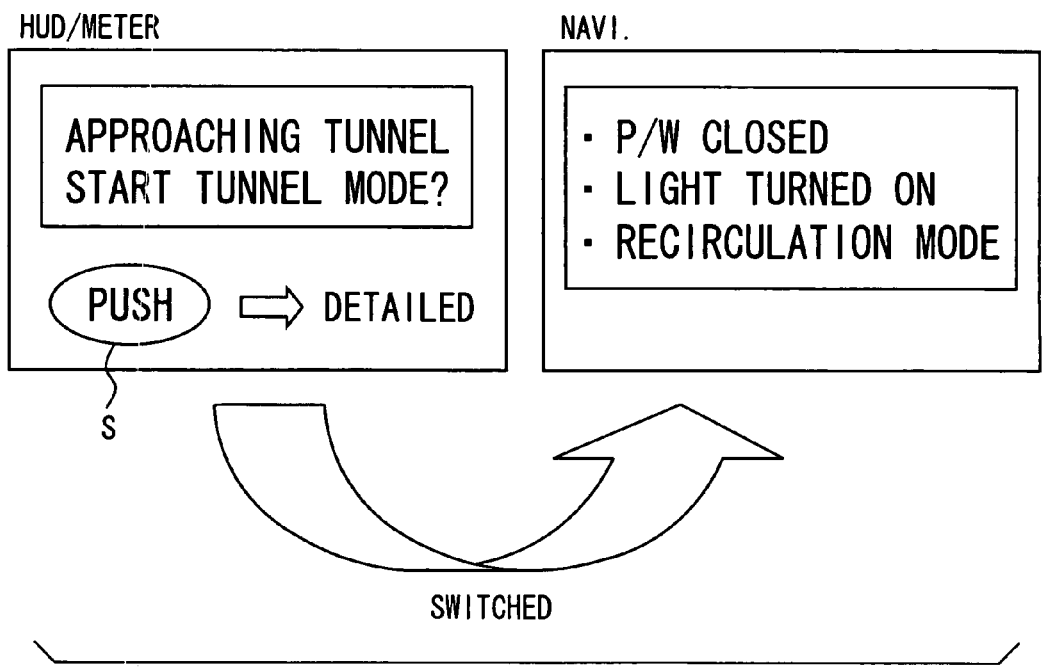
FIG. 13 shows a display example on a display unit under control of a notification controller according to a seventh embodiment.

As shown in FIG. 13, the notification controller 10 allows the display unit (meter and HUD) of the display device 60 to display the selection unit (marked as Push in the drawing) S as well as the message "Approaching a tunnel. Do you start tunnel mode?" The selection unit is used to switch to detailed information related to the notification request information. When the user selects the selection unit S displayed on the display unit, the view of the display unit changes to the detailed information related to the notification request information.

The same display unit may be constructed to switch the view between the notification request information and the detailed information related to it.

Eighth Embodiment

According to the example of the first embodiment, the notification information transmitters 20 through 50 transmit the notification request as shown in FIG. 3 (Step S200). The notification information transmitters receive the information about the notification stop from the notification controller 10 (Step S202). The notification information transmitters stop transmitting the notification request information transmitted at Step S200. According to an eighth embodiment, the notification information transmitters stop transmitting the notification request information and then determine whether or not to detect a condition requiring re-notification. When it is determined that such condition is detected, the notification information transmitters re-transmit the notification request information.

Figures 14, 16:
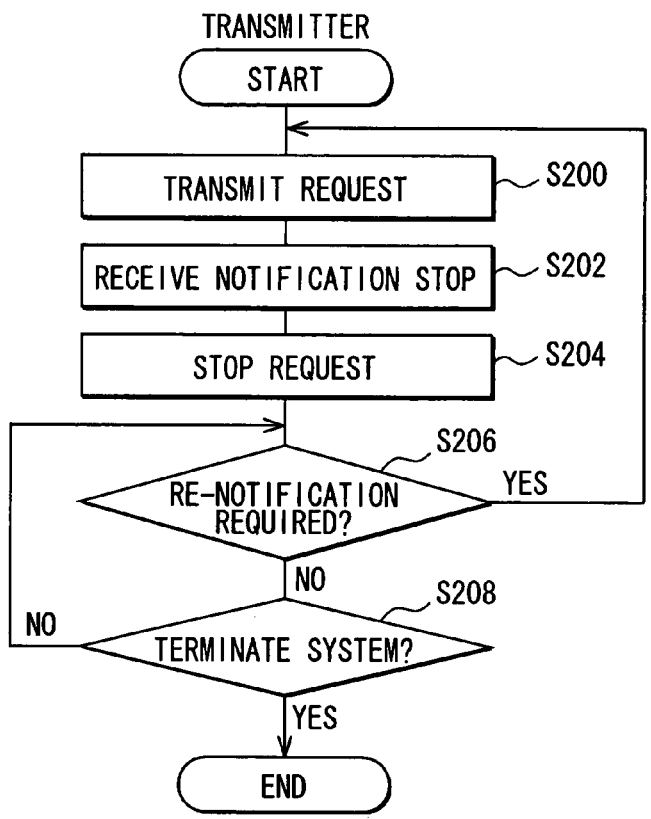
FIG. 14 is a flowchart showing a process of a notification information transmitter according to an eighth embodiment.
FIG. 16 is a diagram illustrating in detail a priority table stored in memory of the notification controller.

FIG. 14 shows a process of the notification information transmitters 20 through 50 according to the embodiment. Turning on an ignition switch allows the transmitters 20 through 50 to start the process in FIG. 14.

The transmitters 20 through 50 transmit a notification request at Step S200. The transmitters receive information indicating the notification stop from the notification controller 10 (Step S202). The transmitters stop transmitting the notification request information (Step S204).

The transmitters 20 through 50 determine whether or not to detect a condition requiring re-notification. Specifically, to do this, the transmitters 20 through 50 check whether or not currently detected states of parts of and around the vehicle match the states contained in the notification request information transmitted at Step S200.

When they match, the determination at Step S206 yields a negative result. The transmitters 20 through 50 determine whether or not to terminate the system (Step S208). Specifically, the transmitters 20 through 50 determines whether or not the ignition switch is turned off.

When the ignition switch is not turned off, the determination at Step S208 yields a negative result. The determination at Step S206 is repeated.

When the currently detected states of parts of and around the vehicle do not match the states contained in the notification request information transmitted at Step S200, the determination at Step S206 yields an affirmative result. The transmitters 20 through 50 return to Step S200.

When those conditions do not match, the transmitters 20 through 50 transmit the notification request information corresponding to the currently detected states of parts of and around the vehicle to the notification controller 10.

When the ignition switch is turned off, the determination at Step S208 yields an affirmative result. The process terminates.

When the user instructs the notification controller 10 to disable the notification as mentioned above, the transmitters 20 through 50 receive information about the disabled notification corresponding to the notification request information from the notification controller 10. In this case, the transmitters 20 through 50 can detect a situation about parts of and around the vehicle. In addition, the transmitters can stop transmitting the notification request information to the notification controller 10.

Ninth Embodiment

According to the example of the eighth embodiment, the notification information transmitters 20 through 50 determine whether or not to detect a condition requiring re-notification. When it is determined to detect such condition, the notification request information is retransmitted to the notification controller 10. According to a ninth embodiment, the transmitters 20 through 50 periodically transmit the notification request information. The notification controller 10 determines the necessity of notification based on the notification request information transmitted from the transmitters 20 through 50. When the notification is determined to be necessary, the notification controller 10 allows the notification apparatuses 60 through 65 to perform the notification.

Figure 15:
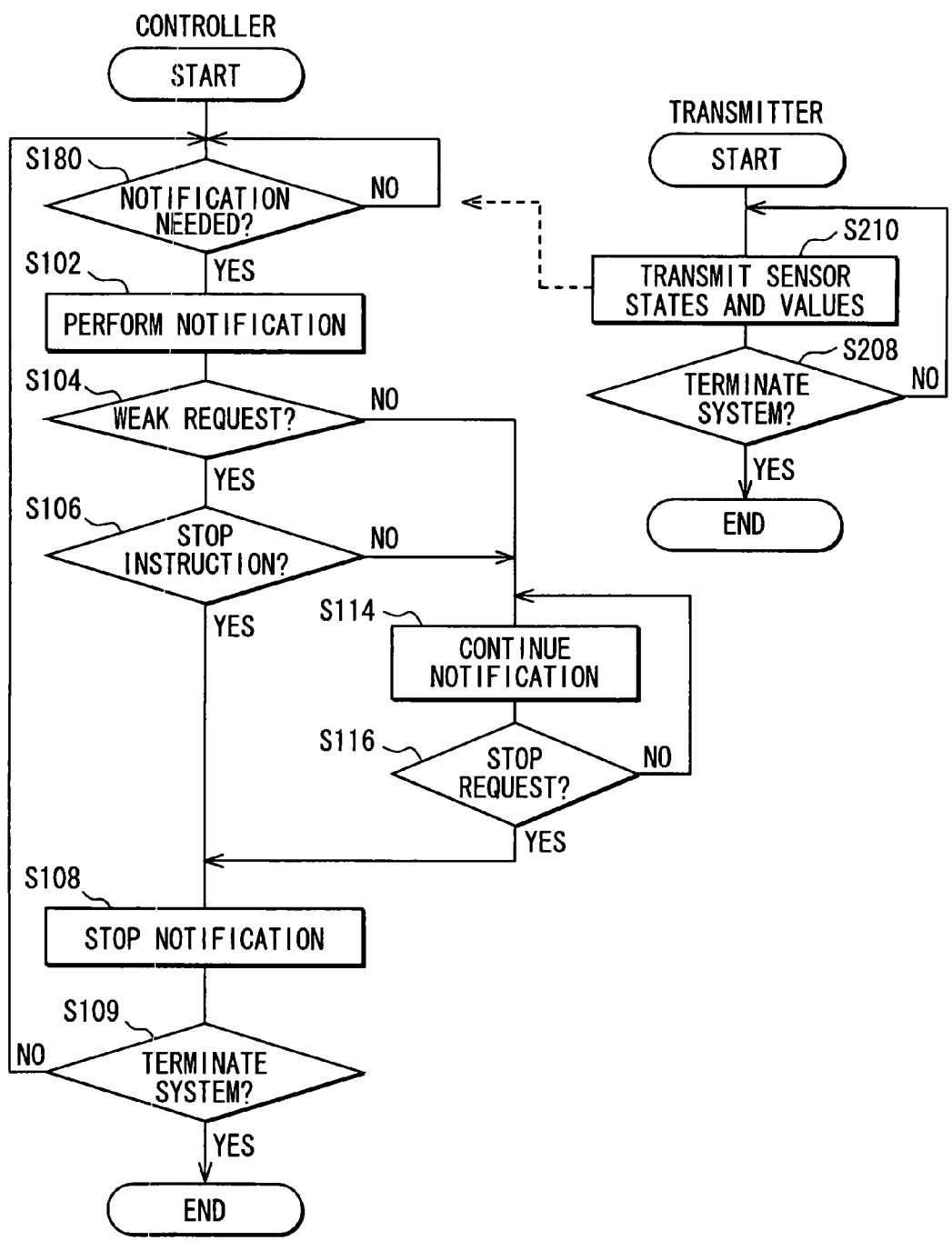
FIG. 15 is a flowchart showing processes of a notification information transmitter and a notification controller according to a ninth embodiment.

FIG. 15 shows processes of the notification information transmitters 20 through 50 and the notification controller 10 according to the embodiment. When the ignition switch is turned on to activate an operation state, the transmitters 20 through 50 and the notification controller 10 independently start the respective processes in FIG. 15.

The notification information transmitters 20 through 50 transmit notification request information corresponding to a situation about parts of and around the vehicle (Step S210). Specifically, the transmitters 20 through 50 transmit the notification request information containing the situation about parts of and around the vehicle (sensor states and values) to the notification controller 10.

The notification information transmitters 20 through 50 determine whether or not to terminate the system (Step S208). Specifically, the transmitters determine whether or not the ignition switch is turned off.

When the ignition switch is not turned off, the determination at Step S208 yields a negative result. The notification information transmitters 20 through 50 repeat the determination at Step S210. When the ignition switch is turned off, the process terminates.

The notification controller 10 determines the necessity of notification (Step S180). Specifically, the notification controller 10 determines whether or not there is a change in the notification request information periodically transmitted from the notification information transmitters 20 through 50.

The situation about parts of and around the vehicle (sensor states and values) is contained in the notification request information periodically transmitted from the notification information transmitters 20 through 50. When there is no change in the situation, the determination at Step S180 results in "no notification needed." The notification controller 10 repeats the determination at Step S180.

When there is a change in that situation, the determination at Step S180 results in "notification needed." The notification controller 10 proceeds to Step S102.

As mentioned above, the notification controller 10 can determine whether or not the notification request information needs to be transmitted. The notification controller 10 can allow the notification apparatus to perform the notification in accordance with input of the notification request information from the notification information transmitter 20 through 50.

Tenth Embodiment

As shown in FIG. 16, the memory of the notification controller 10 according to a tenth embodiment stores a priority table indicating priorities for identifying a prioritized order of notifications corresponding to the notification request information supplied from the notification information transmitters 20 through 50. The notification request information is categorized into the safety notification request information and the convenience notification request information. Though not shown in the drawing, the priority table also provides a notification method corresponding to the notification request information.

Let us suppose that the notification controller 10 according to the embodiment is supplied with multiple pieces of notification request information from the notification information transmitters 20 through 50. The notification controller 10 allows the notification apparatuses 60 through 65 to notify highly prioritized notification request information in preference to the others in accordance with the priorities shown in the priority table. The user can be appropriately provided with the notification.

Figure 17:
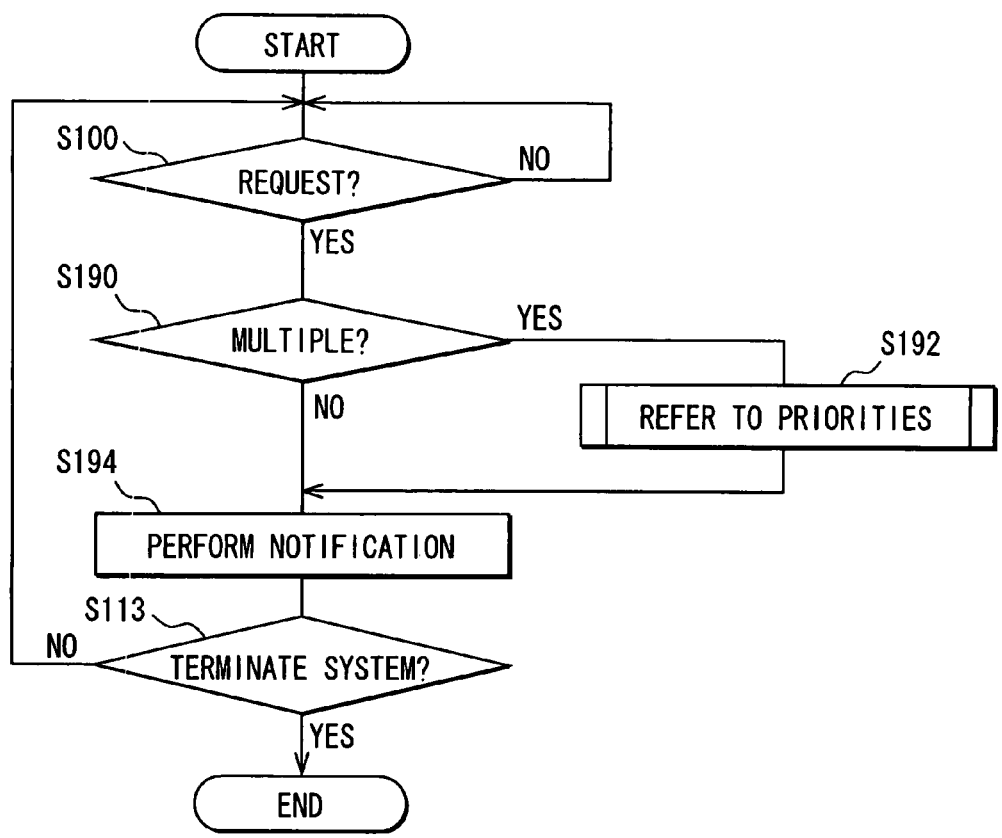
FIG. 17 is a flowchart showing a process of a notification controller according to a tenth embodiment.

FIG. 17 shows a process of the invention according to the embodiment. When the ignition switch is turned on to activate an operation state, the notification controller 10 starts the process in FIG. 17.

The notification controller 10 determines whether or not a notification request is issued (Step S100). When the notification information transmitters 20 through 50 transmit the notification request information, the determination at Step S100 yields an affirmative result. The notification controller 10 determines whether or not multiple pieces of notification request information are supplied (Step S190).

When one piece of notification request information is supplied, the determination at Step S190 yields a negative result. The notification controller 10 performs the notification (Step S194). Specifically, the notification controller 10 allows the notification apparatuses 60 through 65 to perform the notification in accordance with a notification method indicated in the priority table.

The notification controller 10 determines whether or not to terminate the system (Step S113). When the ignition switch is not turned off, the determination at Step S113 yields a negative result. The notification controller 10 returns to Step S100 and repeats the above-mentioned process.

When multiple pieces of notification request information are supplied, the determination at Step S190 yields an affirmative result. The notification controller 10 then performs a priority reference process (Step S192). The priority reference process refers to the priority table in FIG. 16 and specifies the most highly prioritized notification request information in the multiple pieces thereof. Specifically, the notification controller 10 specifies the notification request information corresponding to the highest priority indicated in the priority table. For example, there may be a case of supplying the notification request information with the same priority such as "ETC gate approach" and "ignition key reminder." In such case, the notification controller 10 specifies the most highly prioritized notification request information so as to give preference to "ETC gate approach" as the safety notification request information. In this manner, the notification controller 10 specifies the notification request information having the highest priority in the priority table and proceeds to Step S194.

When multiple pieces of notification request information are supplied, the notification is provided in accordance with the highly prioritized notification request information.

When the ignition switch is turned off, the determination at Step S113 yields an affirmative result. The process terminates.

The above-mentioned construction can determine that the notification information transmitter supplies multiple pieces of notification request information. In such case, the notification is provided by giving preference to the most highly prioritized notification request information in accordance with the priorities indicated in the priority table. The user can be appropriately provided with the notification when multiple notification requests are supplied.

Other Embodiments

The above-mentioned embodiments have described the examples of using the body ECU 20, the occupant monitor 30, the air conditioning ECU 40, and the running system ECU 50 as the notification information transmitters. The invention is not limited to these apparatuses. The notification information transmitters may be constructed using the other apparatuses such as an adaptive cruise control system, a lane keeping system, and a night vision, for example.

The above-mentioned embodiments have described the examples of using the display devices 60 through 62, the audio apparatus 63, the vibration apparatus (seat) 64, and the vibration apparatus (steering) 65 as the notification apparatuses. The invention is not limited to these apparatuses. The notification apparatuses may be constructed using the other apparatuses.

According to the examples described in the above-mentioned embodiments, the safety notification request information is assumed to be information that must not be disabled from being notified in accordance with a user operation. The convenience notification request information is assumed to be information that may be disabled from being notified in accordance with a user operation. Such classification is only an example. For example, a table may be used to specify whether or not to disable notification of each notification request information supplied from the notification information transmitter. Based on the information indicated in the table, it may be preferable to determine whether or not to disable notification of the notification request information supplied from notification information transmitter.

The above-mentioned embodiments have described the examples of constructing the operation switch 10a using the touch switch and the steering switch. Only either the touch switch or the steering switch may be used to construct the operation switch 10a.

(Functioning)

The memory of the notification controller 10 may function as a storage means or unit. Steps S102, S120, S126, S130, S144, S146, S152, S154, S156, S172, S174, and S176 may function as a first notification control means or unit. Step S104 may function as a notification stop determination means or unit. Steps S106, S124, S128, and S132 may function as a notification stop confirmation means or unit. Step S108 may function as a notification stop means or unit. Step S114 may function as a notification continuation means or unit. Step S116 may function as a notification stop request determination means or unit. Step S140 may function as an information acquisition means or unit. Step S142 may function as a sight line determination means or unit. Step S150 may function as a notification target determination means or unit. Step S170 may function as a detailed information determination means or unit. Step S110 may function as a notification stop transmission means or unit. Step S200 may function as a transmission means or unit. Step S204 may function as a notification request information stop means or unit. Step S180 may function as a notification necessity determination means or unit. Step S190 may function as a notification request information input determination means or unit. Step S194 may function as a second notification control means or unit.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

(Features)

Features of the subject matter described herein are set out in the following clauses.

A first feature provides: a storage unit for storing a table indicating whether or not to be able to accept a user operation and accordingly disable notification of notification request information supplied from a notification information transmitter, wherein the notification information transmitter transmits notification request information corresponding to a situation about parts of and around or surrounding a vehicle; a first notification control unit for allowing a notification apparatus to perform a notification in accordance with input of notification request information from the notification information transmitter; a notification stop determination unit for determining, based on information indicated in a table, whether or not to be able to accept a user operation and accordingly disable notification of notification request information supplied from the notification information transmitter; a notification stop confirmation unit for prompting a user to enable or disable notification when the notification stop determination unit determines possibility of accepting a user operation and accordingly disabling notification of notification request information supplied from the notification information transmitter; and a notification stop unit for stopping notification performed by the first notification control unit when the notification stop confirmation unit confirms a user's instruction to stop the notification.

According to the above-mentioned construction, it may be determined that the notification request information supplied from the notification information transmitter can be disabled from provision in accordance with a user operation. In this case, the user is inquired whether or not to stop the notification. The notification stops upon confirmation that the user issues an instruction to stop the notification. The user can easily instruct the notification stop to disable the notification and can reduce nuisances.

Here, the notification request information supplied from the notification information transmitter may include (i) safety notification request information concerning safety and (ii) other notification request information other than the safety notification request information (e.g., convenience notification request information concerning convenience), and a notification of the other notification request information may be allowed to be disabled based on a user operation.

A second feature provides a notification continuation unit for continuing notification performed by the first notification control unit when the notification stop determination unit does not determine possibility of accepting a user operation and accordingly disabling notification of notification request information supplied from the notification information transmitter or when the notification stop confirmation unit does not confirm a user response for stopping the notification.

It may not be determined that the notification request information supplied from the notification information transmitter can be disabled from provision in accordance with a user operation. Alternatively, the notification stop confirmation unit may not confirm a user response to stop the notification. In such cases, it is possible to continue the notification performed by the first notification control unit without confirming the user response to stop the notification.

A third feature provides a notification stop request determination unit for determining whether or not the notification information transmitter issues a request to stop providing notification request information. The notification stop unit stops the notification continued by the notification continuation unit when the notification stop request determination unit determines that the notification information transmitter issues a request to stop providing notification request information.

The continued notification can be stopped when the notification information transmitter is determined to issue a request to stop providing notification request information.

According to a fourth feature, the table further contains a notification method for a notification apparatus to notify notification request information supplied from the notification information transmitter. The first notification control unit allows the notification apparatus to perform a notification in accordance with the notification method indicated in the table.

The notification apparatus can perform a notification in accordance with the notification method indicated in the table.

According to a fifth feature, the notification apparatus performs a notification using at least one of notification methods of display, sound, and vibration. The first notification control unit allows the notification apparatus to perform a notification. When the notification stop confirmation unit does not confirm a user's instruction to stop the notification, the first notification control unit allows the notification apparatus to perform the notification using a notification method more recognizable to the user.

When a user instruction to stop the notification is not confirmed, the notification can be provided by stepwise changing the notification method so as to be more recognizable to the user.

According to a sixth feature, the notification apparatus performs a notification using at least one of notification methods of display, sound, and vibration. The notification apparatus includes: an information acquisition unit for acquiring site line information indicating a driver's sight line directed forward or not from a notification information transmitter; and a sight line determination unit for determining whether or not a driver's sight line is directed forward, based on the site line information received via the information acquisition unit indicating a driver's sight line directed forward or not. When the sight line determination unit determines that the driver's sight line is not directed forward, the first notification control unit allows a notification apparatus to provide a notification using a notification method more recognizable to the driver than that applicable to the driver's sight line directed forward determined by the sight line determination unit.

When the driver's sight line is not determined to be directed forward according to the construction, a notification is provided in a notification method more recognizable to the driver than that applicable to the driver's sight line directed forward determined by the sight line determination unit. When the driver drives inattentively, for example, a notification is provided in the notification method more recognizable than that used when the driver drives looking ahead. It is possible to more reliably allow the user to become aware of the notification.

A seventh feature provides a notification target determination unit for determining, based on information indicating an occupant as a notification target stored in the storage unit, which occupant is selected as a notification target for notification request information supplied from a notification information transmitter. A notification apparatus is allowed to provide a notification to the occupant determined as a notification target by the notification target determination unit.

According to the construction, it is determined for which occupant the notification request information supplied from the notification information transmitters is targeted. The notification is provided to the occupant specified as a notification target by this determination. The occupant need not be aware of a notification targeted for the other occupants. This makes it possible to reduce nuisances to the occupant.

According to an eighth feature, a notification apparatus is allowed to notify the most highly prioritized notification request information according to priorities shown in a table in preference to multiple pieces of notification request information when supplied from a notification information transmitter.

When the notification information transmitter supply multiple pieces of notification request information according to the construction, the most highly prioritized notification request information is notified in preference to the others in accordance with the priorities stored in the table. For example, let us consider a case of equally providing an important notification concerning safety and a less important notification such as announcement. The user may not notice the important notification at all or may notice it too late. The above feature can solve such situation.

According to a ninth feature, the first notification control unit allows a notification apparatus to provide a notification so that a user can recognize input of notification request information other than the most highly prioritized one.

The notification is provided so that the user can recognize input of the notification request information other than the most highly prioritized notification request information. The user can recognize input of the notification request information other than the most highly prioritized one.

A tenth feature provides a detailed information determination unit for determining whether or not notification request information supplied from the notification information transmitter contains detailed information related to that information. When the detailed information determination unit determines that the notification request information contains detailed information related to it, the first notification control unit allows multiple display units to independently display the notification request information and the detailed information related to it.

According to the construction, when the notification request information is determined to contain detailed information related to it, these pieces of information may be independently displayed on multiple display units. The user can use multiple display units to simultaneously recognize the notification request information and the detailed information related to it.

An eleventh feature provides a notification stop transmission unit for, when the notification stop unit stops notification performed by the first notification control unit, transmitting information indicating the notification stop to the notification information transmitter.

When the notification stop unit stops notification performed by the first notification control unit according to the construction, information indicating the notification stop is transmitted to the notification information transmitter. The notification information transmitter can receive this information and recognize that the notification is stopped in accordance with a user instruction to stop the notification. The notification information transmitter can transmit new notification request information when needed.

A twelfth feature provides a notification necessity determination unit for determining necessity of a notification based on notification request information supplied from a notification information transmitter. When the notification necessity determination unit determines necessity of a notification, the first notification control unit allows a notification apparatus to perform a notification.

According to the construction, a notification is performed when the notification necessity determination unit determines the necessity of a notification. The notification controller can determine the necessity of a notification and allow a notification apparatus to perform the notification.

A thirteenth feature provides a notification controller for allowing a notification apparatus to perform a notification in accordance with notification request information supplied from a notification information transmitter that detects a situation about parts of and around a vehicle. The notification controller includes: a storage unit for storing a priority table providing notification request information supplied from the notification information transmitter with priorities for identifying a prioritized order of notifications; a notification request information input determination unit for determining whether or not a notification information transmitter supplies multiple pieces of notification request information; and a second notification control unit for, when the notification request information input determination unit determines input of multiple pieces of notification request information from the notification information transmitter, allowing a notification apparatus to preferentially notify the most highly prioritized notification request information in accordance with priorities indicated in the priority table.

The construction can determine that the notification information transmitter supplies multiple pieces of notification request information. In such case, the notification is provided by giving preference to the most highly prioritized notification request information in accordance with the priorities indicated in the priority table. The user can be appropriately provided with the notification when multiple notification requests are supplied.

A fourteenth feature provides: a transmission unit for detecting a situation about parts of and around a vehicle and transmitting notification request information corresponding to the detected situation to a notification controller that allows a notification apparatus to perform a notification; and a notification request information stop unit for allowing the transmission unit to stop transmitting notification request information when receiving, from the notification controller, information indicating a stop of a notification corresponding to notification request information in accordance with a user instruction for allowing the notification controller to stop the notification.

According to the construction, a notification information transmitter may receive, from the notification controller, information indicating a stop of a notification corresponding to notification request information in accordance with a user instruction for allowing the notification controller to stop the notification. In this case, the notification information transmitter detects a situation about parts of and around the vehicle and stops transmitting the notification request information corresponding to the detected situation to the notification controller. In this manner, the notification information transmitter can identify the notification stop and stop transmitting the notification request information.

A fifteenth feature provides a notification control method for controlling a notification apparatus to perform notification. The notification apparatus is controlled to perform notification in accordance with input of notification request information, which is supplied from a notification information transmitter and corresponding to a situation about parts of and around a vehicle. The notification control method comprises the steps of: (i) storing a table indicating information as to whether or not notification of notification request information is allowed to be disabled based on a user operation; (ii) receiving notification request information from the notification information transmitter; (iii) allowing the notification apparatus to perform a notification of the received notification request information, (iv) determining, based on the information indicated in the stored table, whether or not notification of the received notification request information is allowed to be disabled based on a user operation; (v) prompting a user to enable or disable notification when the notification of the received notification request information is determined to be allowed to be disabled based on a user operation; and (vi) stopping the performed notification of the received notification request information when a user instruction to stop the notification is determined.

Similarly with the first feature, according to the above-mentioned construction, it may be determined that the notification request information supplied from the notification information transmitter can be disabled from provision in accordance with a user operation. In this case, the user is inquired whether or not to stop the notification. The notification stops upon confirmation that the user issues an instruction to stop the notification. The user can easily instruct the notification stop to disable the notification and can reduce nuisances.

It will be obvious to those skilled in the art that various changes may be made in the above-described embodiments of the present invention. However, the scope of the present invention should be determined by the following claims.

What is claimed is:

1. A notification controller comprising:
   a storage unit for storing a table indicating information as to whether or not notification of notification request information is allowed to be disabled based on a user operation, the notification request information being supplied from a notification information transmitter and corresponding to a situation about parts of and around a vehicle;
   a first notification control unit for allowing a notification apparatus to perform a notification in accordance with input of the notification request information;
   a notification stop determination unit for determining, based on the information indicated in the stored table, whether or not notification of the notification request information is allowed to be disabled based on a user operation;
   a notification stop confirmation unit for prompting a user to enable or disable notification when the notification stop determination unit determines that notification of the notification request information is allowed to be disabled based on a user operation; and
   a notification stop unit for stopping notification performed by the first notification control unit when the notification stop confirmation unit confirms a user instruction to stop the notification.

2. The notification controller of claim 1, further comprising:
   a notification continuation unit for continuing notification performed by the first notification control unit when the notification stop determination unit determines that notification of the notification request information is not allowed to be disabled based on a user operation or when the notification stop confirmation unit does not confirm a user response for stopping the notification.

3. The notification controller of claim 2, further comprising:
   a notification stop request determination unit for determining whether or not the notification information transmitter issues a request to stop providing notification request information, wherein
   the notification stop unit stops the notification continued by the notification continuation unit when the notification stop request determination unit determines that the notification information transmitter issues a request to stop providing notification request information.

4. The notification controller of claim 1, wherein
   the notification apparatus performs a notification using at least one of notification methods of display, sound, and vibration;
   the table further contains a notification method for a notification apparatus to notify notification request information supplied from the notification information transmitter; and
   the first notification control unit allows the notification apparatus to perform a notification in accordance with the notification method indicated in the table.

5. The notification controller of claim 1, wherein
   the notification apparatus performs a notification using at least one of notification methods of display, sound, and vibration; and
   when the notification stop confirmation unit does not confirm a user instruction to stop the notification, the first notification control unit allows the notification apparatus to perform the notification using a notification method more recognizable to the user.

6. The notification controller of claim 1, wherein
   the notification apparatus performs a notification using at least one of notification methods of display, sound, and vibration;
   the notification apparatus includes (i) an information acquisition unit for acquiring sight line information as to whether or not a driver's sight line is directed forward from a notification information transmitter and (ii) a sight line determination unit for determining whether or not a driver's sight line is directed forward, based on the site line information received via the information acquisition unit; and
   when the sight line determination unit determines that the driver's sight line is not directed forward, the first notification control unit allows a notification apparatus to provide a notification using a notification method more recognizable to the driver than that applicable to the driver's sight line directed forward determined by the sight line determination unit.

7. The notification controller of claim 1, further comprising:
   a notification target determination unit for determining which occupant is selected as a notification target for the notification request information based on information indicating an occupant as a notification target stored in the storage unit, wherein the first notification control unit allows the notification apparatus to provide a notification to the occupant determined as a notification target by the notification target determination unit.

8. The notification controller of claim 1, wherein the notification apparatus is allowed to notify a most highly prioritized notification request information according to priorities shown in the table in preference to multiple pieces of notification request information when supplied from the notification information transmitter.

9. The notification controller of claim 8, wherein the first notification control unit allows the notification apparatus to provide a notification so that a user recognizes input of notification request information other than the most highly prioritized one.

10. The notification controller of claim 1, further comprising:

a detailed information determination unit for determining whether or not notification request information supplied from the notification information transmitter contains detailed information, wherein when the detailed information determination unit determines that the notification request information contains detailed information, the first notification control unit allows multiple display units to independently display the notification request information and the detailed information.

11. The notification controller of claim 1, further comprising:

a notification stop transmission unit for, when the notification stop unit stops notification performed by the first notification control unit, transmitting information indicating the notification stop to the notification information transmitter.

12. The notification controller of claim 1, further comprising:

a notification necessity determination unit for determining necessity of a notification based on notification request information supplied from the notification information transmitter, wherein when the notification necessity determination unit determines necessity of a notification, the first notification control unit allows the notification apparatus to perform a notification.

13. The notification controller of claim 1, wherein the notification request information supplied from the notification information transmitter includes (i) safety notification request information concerning safety and (ii) other notification request information other than the safety notification request information, and a notification of the other notification request information is allowed to be disabled based on a user operation.

14. A notification controller for allowing a notification apparatus to perform a notification in accordance with notification request information supplied from a notification information transmitter that detects a situation about parts of and around a vehicle, the notification controller comprising:

a storage unit for storing a priority table providing notification request information supplied from the notification information transmitter with priorities for identifying a prioritized order of notifications;

a notification request information input determination unit for determining whether or not the notification information transmitter supplies multiple pieces of notification request information; and a second notification control unit for, when the notification request information input determination unit determines input of multiple pieces of notification request information from the notification information transmitter, allowing the notification apparatus to preferentially notify a most highly prioritized notification request information in accordance with priorities indicated in the priority table.

15. A notification information transmitter comprising:

a transmission unit for detecting a situation about parts of and around a vehicle and transmitting notification request information corresponding to the detected situation to a notification controller that allows a notification apparatus to perform a notification; and a notification request information stop unit for allowing the transmission unit to stop transmitting notification request information when receiving, from the notification controller, information indicating a stop of a notification corresponding to notification request information in accordance with a user instruction for allowing the notification controller to stop the notification.

16. A notification control method for controlling a notification apparatus to perform notification in accordance with input of notification request information, which is supplied from a notification information transmitter and corresponding to a situation about parts of and around a vehicle, the notification control method comprising the steps of:

storing a table indicating information as to whether or not notification of notification request information is allowed to be disabled based on a user operation;

receiving notification request information from the notification information transmitter;

allowing the notification apparatus to perform a notification of the received notification request information;

determining, based on the information indicated in the stored table, whether or not notification of the received notification request information is allowed to be disabled based on a user operation;

prompting a user to enable or disable notification when the notification of the received notification request information is determined to be allowed to be disabled based on a user operation; and stopping the performed notification of the received notification request information when a user instruction to stop the notification is determined.

\* \* \* \* \*